US007958001B2

(12) United States Patent
Abbadessa et al.

(10) Patent No.: US 7,958,001 B2
(45) Date of Patent: Jun. 7, 2011

(54) COMPUTER-BASED METHOD FOR ASSESSING COMPETENCE OF AN ORGANIZATION

(75) Inventors: Rico Abbadessa, Zurich (CH); Christoph Ziegler, Cham (CH); Andreas Machler, Winterthur (CH); Lars Andersson, Basel (CH); Rolf Winter, Bach (CH); Vladimir Bezouska, Oberrieden (CH)

(73) Assignee: Swiss Reinsurance Company, Zürich (CH)

( * ) Notice: Subject to any disclaimer, the term of this patent is extended or adjusted under 35 U.S.C. 154(b) by 1332 days.

(21) Appl. No.: 10/833,032

(22) Filed: Apr. 28, 2004

(65) Prior Publication Data
US 2005/0246184 A1 Nov. 3, 2005

(51) Int. Cl.
*G06F 11/34* (2006.01)
(52) U.S. Cl. ............... 705/7.38; 705/7.39; 705/7.41
(58) Field of Classification Search .......... 705/1, 7–11
See application file for complete search history.

(56) References Cited

U.S. PATENT DOCUMENTS

| | | | | |
|---|---|---|---|---|
| 4,348,740 | A * | 9/1982 | White ................... | 709/253 |
| 5,551,880 | A * | 9/1996 | Bonnstetter et al. ........ | 434/236 |
| 5,684,964 | A * | 11/1997 | Powers et al. ............ | 705/11 |
| 5,726,914 | A * | 3/1998 | Janovski et al. .......... | 702/84 |
| 5,909,669 | A * | 6/1999 | Havens ................. | 705/11 |
| 6,338,042 | B1 * | 1/2002 | Paizis ................... | 705/11 |
| 6,477,504 | B1 * | 11/2002 | Hamlin et al. ........... | 705/10 |
| 6,502,745 | B1 * | 1/2003 | Stimson et al. .......... | 235/375 |
| 6,556,974 | B1 * | 4/2003 | D'Alessandro .......... | 705/10 |
| 6,574,638 | B1 * | 6/2003 | Gustman et al. ........... | 1/1 |
| 6,581,071 | B1 * | 6/2003 | Gustman et al. ........ | 707/104.1 |
| 6,604,084 | B1 * | 8/2003 | Powers et al. ........... | 705/11 |
| 6,606,804 | B2 * | 8/2003 | Kaneko et al. ........... | 36/88 |
| 6,625,511 | B1 * | 9/2003 | Suzuki et al. ........... | 700/110 |
| 6,631,370 | B1 * | 10/2003 | Pekkanen ............... | 1/1 |
| 6,694,329 | B2 | 2/2004 | Murray | |
| 6,711,253 | B1 * | 3/2004 | Prabhaker ............ | 379/265.01 |
| 6,877,034 | B1 * | 4/2005 | Machin et al. ........... | 709/223 |
| 6,901,426 | B1 * | 5/2005 | Powers et al. .......... | 709/203 |
| 6,968,312 | B1 * | 11/2005 | Jordan et al. ............ | 705/7 |

(Continued)

OTHER PUBLICATIONS

Subjectivity and the Weighting of Performance Measures: Evidence from a Balanced Scorecard; Christopher D. Ittner, David F. Larcker and Marshall W. Meyer; The Accounting Review vol. 78, No. 3, Jul. 2003 725-758.*

Measuring organizational performance in the absence of objective measures: The case of the privately-held firm and conglomerate business unit; Dess, Gregory G., Robinson, Richard B., Jr.; Strategic Management Journal Chichester: Jul.-Sep. 1984. vol. 5, Iss. 3; p. 265.*

(Continued)

*Primary Examiner* — Lynda C Jasmin
*Assistant Examiner* — Alan Miller
(74) *Attorney, Agent, or Firm* — Oblon, Spivak, McClelland, Maier & Neustadt, L.L.P.

(57) ABSTRACT

Stored in a computer are scores related to answers given by human representatives of organizational units in response to defined questions. For the organizational units, total scores and weighted total scores are calculated. The weighted total scores are calculated by adding up weighted maximum scores assigned to the questions, the weighted maximum scores depending on the respective organizational unit and the respective question. Competence levels of the organizational units are calculated by scaling the total scores of the respective organizational unit to a scale of competence reaching from zero to a maximum competence. The maximum competence corresponds to the weighted total score calculated for the respective organizational unit. The computer generates a graphical representation of the competence levels for multiple organizational units of a particular organization. In one common graph, the competence levels are visualized so that deficiencies of the competence levels from the maximum competence as well as differences between the competence levels of the organizational units are visualized.

23 Claims, 6 Drawing Sheets

U.S. PATENT DOCUMENTS

| | | | |
|---|---|---|---|
| 6,976,002 B1* | 12/2005 | Ferguson et al. | 705/11 |
| 7,136,827 B2* | 11/2006 | Eicher | 705/10 |
| 7,233,908 B1* | 6/2007 | Nelson | 705/10 |
| 7,233,910 B2* | 6/2007 | Hileman et al. | 705/11 |
| 7,376,647 B1* | 5/2008 | Guyan et al. | 707/748 |
| 7,398,223 B2* | 7/2008 | Kahlert et al. | 705/10 |
| 2002/0032639 A1* | 3/2002 | Hausken et al. | 705/37 |
| 2002/0052774 A1* | 5/2002 | Parker et al. | 705/10 |
| 2002/0173999 A1* | 11/2002 | Griffor et al. | 705/7 |
| 2003/0050830 A1 | 3/2003 | Troyer | |
| 2003/0055718 A1* | 3/2003 | Cimini et al. | 705/11 |
| 2003/0061141 A1* | 3/2003 | D'Alessandro | 705/36 |
| 2003/0158924 A1 | 8/2003 | DeLegge | |
| 2004/0032420 A1 | 2/2004 | Allen et al. | |
| 2004/0054545 A1* | 3/2004 | Knight | 705/1 |
| 2004/0059628 A1 | 3/2004 | Parker et al. | |
| 2004/0068431 A1* | 4/2004 | Smith et al. | 705/10 |
| 2005/0144592 A1* | 6/2005 | Below et al. | 717/124 |

OTHER PUBLICATIONS

Conducting Interorganizational Research Using Key Informants; Nirmalya Kumar, Louis W. Stern, James C. Anderson; The Academy of Management Journal, vol. 36, No. 6 (Dec. 1993), pp. 1633-1651.*

Applying environmental criteria to supplier assessment: A study in the application of the Analytical Hierarchy Process Robert Handfield, Steven V. Walton, Robert Sroufe , Steven A. Melnyk; European Journal of Operational Research 141 (2002) 70-87.*

Measuring performance in a changing business environment Mike Kennerley; Andy Neely; International Journal of Operations & Production Management; 2003; 23, 2; ABI/INFORM Global p. 213.*

Australian Search Report for Australian Patent Application No. 2005239015 mailed on May 30, 2008, 2 pgs.

* cited by examiner

COMPUTER-BASED METHOD FOR ASSESSING COMPETENCE OF AN ORGANIZATION

FIELD OF THE INVENTION

The present invention relates to a computer-based method for assessing competence of an organization. Specifically, the present invention relates to a computer-based method for assessing competence levels of an organization comprising multiple organizational units. In a particular application, the present invention relates to a computer-based method for assessing a competence level of an organization for a specific defined aspect of the organization.

BACKGROUND OF THE INVENTION

For any organization, be it an institution in the service industry, in the manufacturing industry, or in the government, knowing its competence level is essential for determining areas of deficiencies and opportunities for improvement, for assessing compatibility with partners, or for comparisons with competitors. The term "competence" relates to sufficiency and adequacy of quality, expertise, skill, and sophistication in various aspects of an organization including aspects relating to management of resources and know-how, aspects relating to management of documentation and information, and aspects relating to processes, workflows, and organizational set-up.

While there are almost as many methodologies for assessing an organization as there are business consultants, the results provided by these methodologies typically consists in lengthy and complex reports. Generally, reading these reports is time consuming if not difficult. Consequently, the reports are often not read completely and the result of the assessment is not communicated clearly to representatives of the respective organization. Moreover, based on such reports, it is very difficult to compare objectively assessments of different (competitive/peer) organizations.

Typically, organizations comprise multiple organizational units with different levels and areas of responsibilities and expertise. Generally, conventional methods for assessing competence of an organization fail to produce results, which make possible direct comparison of the competence levels of all organizational units involved.

SUMMARY OF THE INVENTION

It is an object of this invention to provide a computer-based method and a computer program product for assessing competence of an organization, which do not have the disadvantages of the prior art. In particular, it is an object of the present invention to provide a computer-based method and a computer program product for assessing competence of an organization comprising multiple organizational units.

According to the present invention, stored in a computer are scores related to answers given by a human representative of organizational units in response to defined questions. In the computer, each of said scores is assigned to one of the organizational units. For example, the organization is an insurance company and the organizational units include a management unit, an underwriting unit, a risk management unit, a claims processing unit, and a re-insurance unit. For the organizational units, total scores are calculated in the computer by adding up the scores assigned to the respective organizational unit. Moreover, weighted total scores for the organizational units are calculated in the computer. Each of the weighted total scores is calculated by adding up weighted maximum scores assigned to the questions, the weighted maximum scores each depending on the respective organizational unit and the respective question. Finally, competence levels of the organizational units are calculated in the computer. Each of the competence levels is calculated by scaling the total scores of the respective organizational unit to a scale of competence reaching from zero to a maximum competence. The maximum competence corresponds to the weighted total score calculated for the respective organizational unit. Calculating weighted total scores specifically for each of the organizational units and calculating competence levels for the organizational units based on the respective weighted total scores makes possible competence levels that can be compared directly between organizational units having different levels and areas of responsibilities and expertise.

In an embodiment the defined questions relate to defined aspects of the organization and the total scores of the organizational units are calculated for a specific one of the defined aspects of the organization. For example, included in the defined aspects of the organization is an aspect of organizational resources relating to management of resources and know-how, an aspect of organizational information relating to management of documentation and information, and an aspect of organizational structure relating to processes, workflows, and organizational set-up. Each of the total scores is calculated by adding up the scores assigned to the respective organizational unit and to the specific one of the defined aspects of the organization. The weighted total scores of the organizational units are calculated in the computer for a specific one of the defined aspects of the organization. Each of the weighted total scores is calculated by adding up the weighted maximum scores assigned to the specific one of the defined aspects of the organization. The competence levels of the organizational units are calculated in the computer for the specific one of the defined aspects of the organization. Each of the competence levels is calculated by scaling the total scores of the respective organizational unit to a scale of competence reaching from zero to a maximum competence. The maximum competence corresponds to the weighted total score calculated for the respective organizational unit and the specific one of the defined aspects of the organization. Calculating the competence levels of the organizational units for specific defined aspects of the organization makes it possible to identify specific aspects of an organization that show shortcomings and need improvement. Moreover, it is possible to compare the competence levels between organizational units with respect to various detailed aspects of the organization.

In a preferred embodiment, a graphical representation of the competence levels calculated for the organizational units is generated by the computer in one common graph, so that the competence levels are visualized, so that deficiencies of the competence levels from the maximum competence are visualized, and so that differences between the competence levels of the organizational units are visualized. Displaying the calculated competence levels of multiple organizational units in one common graph makes possible a direct, efficient comparison between the organizational units. Without the necessity of reading a written report, deficiencies of the competence levels and differences in the competence levels of different organizational units are visible at one glance.

In a further embodiment, competence levels are calculated and stored for the organizational units of more than one organization. A graphical representation of the competence levels of the organizational units is generated by the computer in one common graph, so that differences between the competence levels of different organizations are visualized. Without the necessity of reading a written report, deficiencies of the competence levels and differences in the competence levels of different organizations and their organizational units are visible at one glance.

In an embodiment, one of the organizational units is selected in the computer and the defined set of questions is divided into different subsets. In the computer, the different subsets are activated or deactivated individually for the selected organizational unit. Deactivated subsets are not included in calculating the competence levels of the organizational units. Excluding deactivated subsets of questions specifically for an organizational unit makes possible adaptation of the calculation of the competence level to different assignments of responsibilities in various organizations, for example with a single click in a user interface.

In an embodiment, data about answers given by the human representative is stored in the computer. The score related to an answer is determined in the computer by means of an expert system rating the data about the respective answer. Automated rating of answers increases efficiency as well as consistency of the rating process.

In an alternative embodiment, each of the scores is assigned in the computer to the respective one of the organizational units as well as to the respective one of the defined questions. The stored scores are weighted with weighting factors determined by the computer based on the organizational unit and the defined question assigned to the respective score. In the computer, the total scores are calculated for the organizational units by adding up the weighted scores assigned to the respective organizational units. Finally, the competence levels of the organizational units are calculated by scaling the total scores of the respective organizational unit to a scale of competence reaching from zero to a maximum competence, the maximum competence corresponding to a perfect total score.

In a further alternative embodiment, the defined questions relate to defined aspects of the organization and the total scores of the organizational units are calculated in the computer for a specific one of the defined aspects of the organization, each of the total scores being calculated by adding up the weighted scores assigned to the respective organizational unit and to the specific one of the defined aspects of the organization. The competence levels of the organizational units are calculated in the computer for the specific one of the defined aspects of the organization, each of the competence levels being calculated by scaling the total scores of the respective organizational unit to a scale of competence reaching from zero to a maximum competence, the maximum competence corresponding to a perfect total score for the specific one of the defined aspects of the organization.

In addition to a computer-based method for assessing competence of an organization, the present invention also relates to a computer program product including computer program code means for controlling one or more processors of a computer, particularly, a computer program product including a computer readable medium containing therein the computer program code means.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
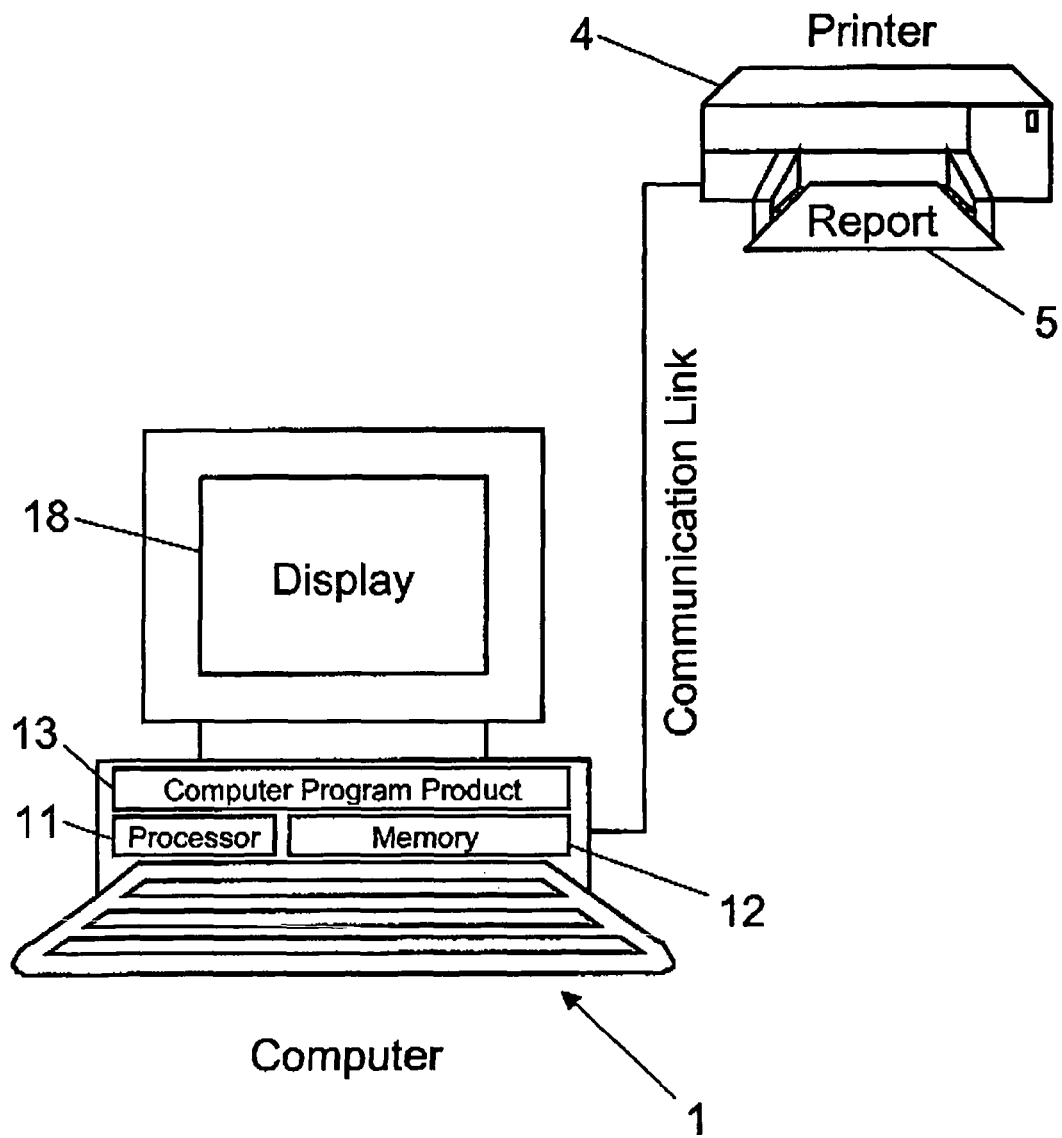
FIG. 1 shows a block diagram illustrating schematically an exemplary configuration of a system for practicing embodiments of the present invention, said configuration comprising a computer with a display, a processor, a keyboard, and memory.

In FIG. 1, reference numeral 1 refers to a computer, for example a personal computer. As is illustrated schematically, computer 1 includes a display 3, at least one processor 11, memory 12 for storing data and programs, as well as a computer program product 13. The computer program product 13 comprises computer program code for controlling processor 11 so that the computer 1 executes various functions described below in more detail with reference to FIGS. 2, 3, and 6. The computer program code is stored in a computer readable medium, either in memory integrated in computer 1 or on a data carrier that can be inserted into computer 1. The computer 1 is connected via communication link 14 to printer 4.

Figure 2:
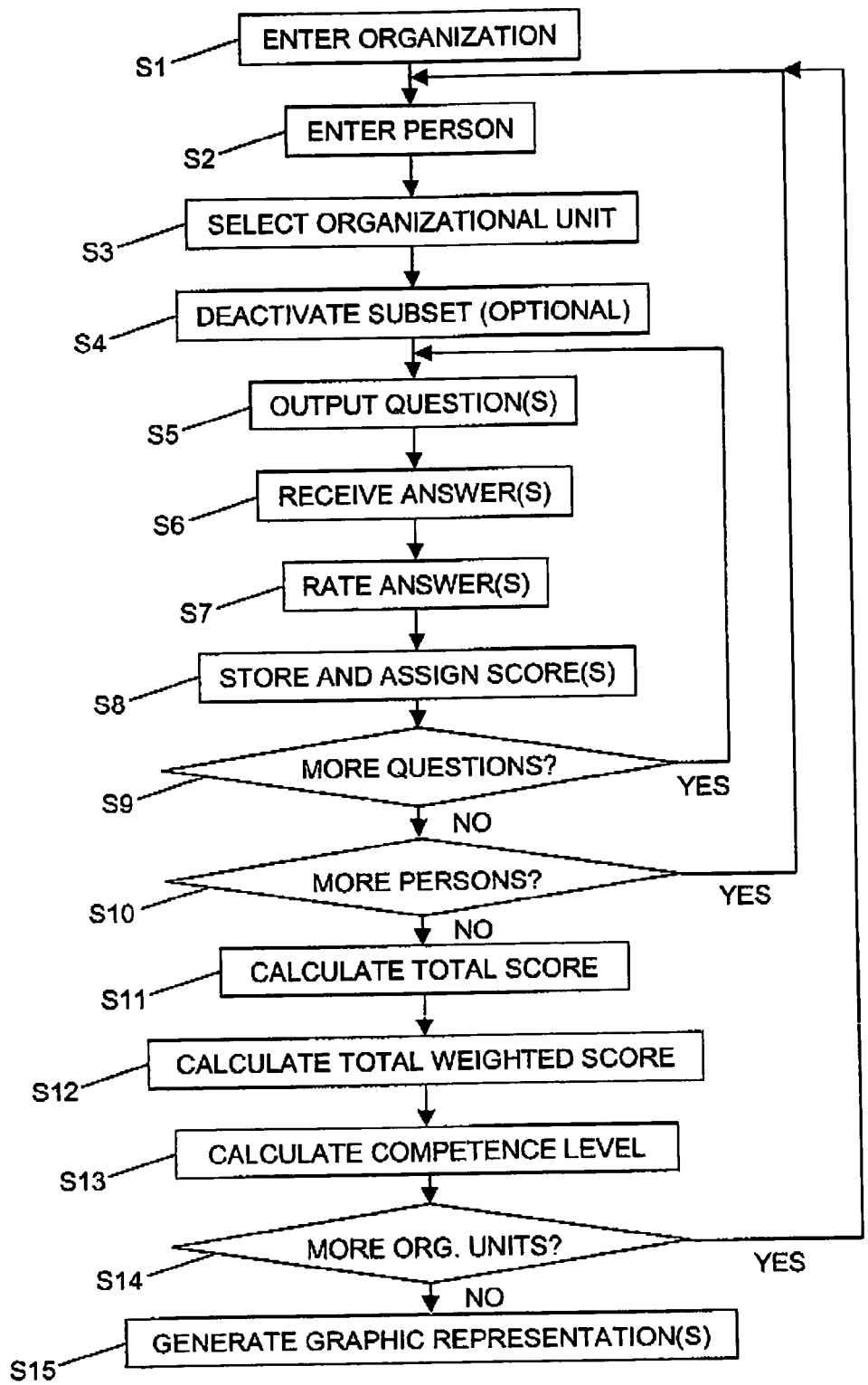
FIG. 2 shows a flow diagram illustrating an example of a sequence of steps executed according to the present invention.
Figure 3:
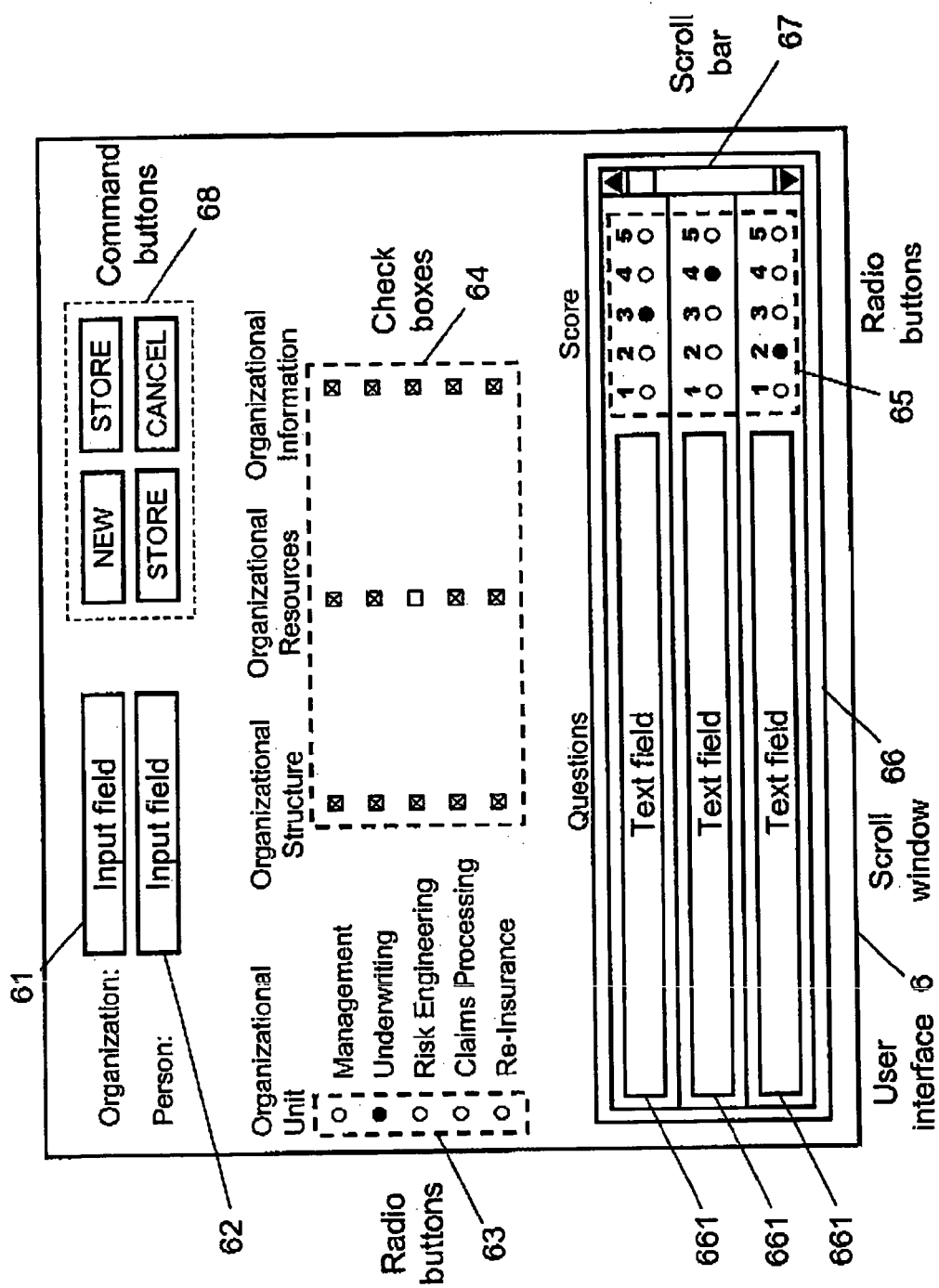
FIG. 3 shows an exemplary layout of a user interface for controlling execution of embodiments of the present invention.

In the following paragraphs, execution of steps of the proposed method is described with reference to FIGS. 2 and 3. FIG. 2 shows a flow diagram illustrating a possible sequence of the steps of the proposed method FIG. 3 shows a possible graphical user interface 6 for controlling execution of the proposed method and for exchanging data with computer 1.

In step S1, information for identifying an organization is entered into computer 1. In user interface 6, information for identifying the organization is entered as a name or code in input field 61. The organization can also be selected from a pick list.

In step S2, information for identifying a person (i.e. an interviewee) is entered into computer 1. In user interface 6, information for identifying the person is entered as a name or code in input field 62. The person can also be selected from a pick list.

In step S3, an organizational unit of the organization specified in step S1 is selected in computer 1. In user interface 6, the organizational unit is selected by clicking one of the radio buttons 63. Each of the radio buttons 63 is assigned to one of the organizational units. The organizational units "Management", "Underwriting", "Risk Engineering", Claims Processing", and "Re-Insurance" are included in user interface 6. In FIG. 3, the organizational unit "Underwriting" is selected. Based on the person specified in step S2, the organizational unit could also be selected automatically by computer 1 from a personnel list stored in memory 12 or on a data carrier inserted in computer 1.

In step S4, defined subsets of questions can optionally be deactivated. In user interface 6, subsets of questions related to specific organizational aspects are deactivated or activated, respectively, by un-checking or checking one of the check boxes 64, respectively. The organizational aspects "Organizational Structure", "Organizational Resources", and "Organizational Information" are included in user interface 6.

Based on the organizational unit selected in step S3, subsets of questions could also be deactivated or activated, respectively, automatically by computer 1 from an organizational unit profile stored in memory 12 or on a data carrier inserted in computer 1. In the example shown in FIG. 3, the subset of questions related to "Organizational Resources" is deactivated for the organizational unit "Risk Engineering", i.e. persons working in risk engineering will not be exposed to questions related to organizational resources.

In step S5, one or more defined questions are provided as output. In user interface 6, the questions are provided in the form of text displayed in text fields 661. In the example of FIG. 3, multiple questions are displayed concurrently in scroll window 66. Scroll window 66 is controlled by means of scroll bar 67. The questions could also be provided in the form of audible spoken text. The questions are stored in memory 12 or on a data carrier inserted in computer 1. As is illustrated in Table 1, each question includes an identification $q_1, q_2, \ldots, q_n$ and content $t_1, t_2, \ldots, t_n$. The content $t_1, t_2, \ldots, t_n$ includes alphanumeric text data, audio data, or encoded speech information. As is also illustrated in Table 1, each of the questions is assigned to one of the organizational aspects "P" ("Organizational Structure") relating to processes, workflows, and organizational set-up, "R" ("Organizational Resources") relating to management of resources and know-how, or "I" ("Organizational information") relating to management of documentation and information. Furthermore, maximum scores are assigned to each of the questions. Specifically, for each of the organizational units "Management", "Underwriting", "Risk Engineering", Claims Processing", and "Re-Insurance", a specific maximum score ranging from "1" to "5" (or low to high) is assigned to each of the questions.

TABLE 1

| Question Identification | Content | Organizational aspect | Maximum scores | | | | |
| --- | --- | --- | --- | --- | --- | --- | --- |
| | | | Management | Underwriting | Risk Engineering | Claims Processing | Re-Insurance |
| $q_1$ | $t_1$ | "P" | "3" | "3" | "1" | "5" | "4" |
| $q_2$ | $t_2$ | "P" | "3" | "3" | "2" | "4" | "5" |
| $q_3$ | $t_3$ | "P" | "5" | "4" | "3" | "3" | "1" |
| $q_4$ | $t_4$ | "P" | "4" | "5" | "2" | "1" | "3" |
| $q_5$ | $t_5$ | "R" | "1" | "3" | "5" | "2" | "3" |
| $q_6$ | $t_6$ | "R" | "5" | "3" | "3" | "2" | "2" |
| $q_7$ | $t_7$ | "R" | "3" | "4" | "3" | "2" | "5" |
| $q_8$ | $t_8$ | "R" | "3" | "3" | "3" | "5" | "5" |
| $q_9$ | $t_9$ | "I" | "3" | "3" | "5" | "2" | "2" |
| ... | ... | ... | ... | ... | ... | ... | ... |
| $q_n$ | $t_n$ | "I" | "4" | "5" | "3" | "3" | "3" |

In step S6, answers are received for each of the questions provided as output in step S5. For example, the questions are received by a human interviewer. The answers could also be received and stored by computer 1 in the form of data. For example, answer date includes text entered into an input field (not illustrated) of user interface 6, or audio or encoded speech information entered by means of a microphone, audio processor, and speech processor.

TABLE 2

| Question identification | Organizational unit | Person | Score |
| --- | --- | --- | --- |
| $q_1$ | Management | $p_1$ | "3" |
| $q_2$ | Management | $p_1$ | "4" |
| ... | ... | ... | ... |

TABLE 2-continued

| Question identification | Organizational unit | Person | Score |
| --- | --- | --- | --- |
| $q_{12}$ | Underwriting | $p_1$ | "2" |
| ... | ... | ... | ... |
| $q_{27}$ | Risk Management | $p_1$ | "5" |
| ... | ... | ... | ... |
| $q_{27}$ | Claims Processing | $p_1$ | "5" |
| ... | ... | ... | ... |
| $q_{n-1}$ | Re-insurance | $p_1$ | "4" |
| $q_n$ | Re-insurance | $p_1$ | "3" |

In step S7, the answers received in step S6 are rated. In user interface 6, for answers received in step S6, scores ranging from low ("1") to high ("5") can be assigned manually to the respective questions. In the example of FIG. 3, scores are entered by clicking one of the radio buttons 65 assigned to the questions. For example, the answer received for the question listed at the top of scroll window 66 was rated with a medium ("3") score. Answer data stored by computer 1 in step S5 could also be rated automatically by the computer 1, for example by means of a rules based expert system.

In step S8, computer 1 stores the scores assigned to answers received for specific questions in memory 12. As is illustrated in Table 2, each score is assigned to the question $q_1$, $q_2, \ldots, q_n$ for which the particular answer was received. Moreover, information for identification of the person $p_1$, $p_2, \ldots, p_n$ providing the answer and the organizational unit represented by that person is assigned to each score.

If it is determined in step S9 that there are more questions to be provided as output, the next activated question or set of questions is provided in step S5. Otherwise, if there are no more questions to be provided and if scores have been assigned to all questions for answers provided thereto, the method continues in step S10.

In step S10, it is determined whether further persons are to be included in the assessment of organizational competence or whether processing of the collected data should continue in step S11. In user interface 6, this decision can be controlled by the user, for example the interviewer, by means of the command buttons 68. For example, further persons can be added by clicking the "NEW" command button or calculation of the competence of the organizational unit can be initiated by clicking the "PROCESS" command button. At any time entered data can be stored by clicking the "STORE" command button or ignored by clicking the "CANCEL" command button. Additional functions, for example functions for accessing and managing stored information related to a specific organization, organizational unit, or person, can be invoked by control means such as pull down menus or command buttons not illustrated in FIG. 3. Particularly, it is possible to add further persons, organizational units, or organizations at any point in time. The decision of step S10 could also be taken automatically by the computer 1 as soon as the data for all persons in a personnel list has been recorded, for example.

TABLE 3

| Organization | Organizational aspect | Organizational unit | Total weighted score | Total score | Competence level |
|---|---|---|---|---|---|
| Company A | "P" | Management | 464 | 248 | 53 |
| Company A | "P" | Underwriting | 336 | 276 | 82 |
| Company A | "P" | Risk Engineering | 308 | 236 | 77 |
| Company A | "P" | Claims Processing | 256 | 178 | 70 |
| Company A | "P" | Re-Insurance | 289 | 210 | 73 |
| Company A | "P" | Organization | 1653 | 1148 | 69 |
| Company A | "R" | Management | 288 | 210 | 73 |
| Company A | "R" | Underwriting | 332 | 234 | 70 |
| Company A | "R" | Risk Engineering | 320 | 177 | 55 |
| Company A | "R" | Claims Processing | 420 | 299 | 71 |
| Company A | "R" | Re-Insurance | 374 | 219 | 59 |
| Company A | "R" | Organization | 1734 | 1139 | 66 |
| Company A | "I" | Management | 410 | 147 | 36 |
| Company A | "I" | Underwriting | 320 | 257 | 80 |
| Company A | "I" | Risk Engineering | 285 | 191 | 67 |
| Company A | "I" | Claims Processing | 386 | 323 | 84 |
| Company A | "I" | Re-Insurance | 294 | 221 | 75 |
| Company A | "I" | Organization | 1695 | 1139 | 67 |
| Company A | Total | Management | 1162 | 605 | 52 |
| Company A | Total | Underwriting | 988 | 767 | 78 |
| Company A | Total | Risk Engineering | 913 | 604 | 66 |
| Company A | Total | Claims Processing | 1062 | 800 | 75 |
| Company A | Total | Re-Insurance | 957 | 650 | 68 |
| Company A | Total | Organization | 5082 | 3426 | 67 |
| ... | ... | ... | ... | ... | ... |
| Company Z | Total | Organization | 5082 | 3852 | 76 |

In step S11, computer 1 calculates and stores the total score for the organizational unit selected in step S3. The total score of an organizational unit is calculated in computer 1 by adding up all scores assigned in step S8 to the organizational unit.

For example, as is illustrated in Table 3, the total score for the organizational unit "Management" of the organization "Company A" amounts to 605. Preferably, in step S11, the total score of an organizational unit is calculated individually for the various organizational aspects. For example, as is illustrated in Table 3, the total score of the organizational unit "Management" for the organizational aspect related to organizational information ("I") amounts to 147. As is illustrated in Table 3, in step S11, further total scores can be calculated and stored, for example the total score of an organization for a specific aspect or the overall total score of the organization ("Company A": 3426, "Company Z": 3852).

In step S12, computer 1 calculates and stores the total weighted scores for the organizational unit selected in step S3. The total weighted score of an organizational unit is calculated in computer 1 by adding up all maximum scores (see Table 1) assigned to the activated questions and to the organizational unit. Preferably, in step S12, the total weighted score of an organizational unit is calculated individually for the various organizational aspects. For example, a total weighted score (410 in Table 3) for the organizational unit "Management" is calculated specifically for the organizational aspect related to organizational information ("I"). One skilled in the art will understand that step S12 can be executed at an alternative point in time. For example, the total weighted score of the organizational units specific for the various organizational aspects can be calculated and stored as a preparatory step prior to execution of step S1.

In step S13, computer 1 calculates and stores the competence level of the organizational unit selected in step S3. The competence level of the organizational unit is calculated in computer 1 by scaling the total score of the organizational unit calculated in step S11 to a scale of competence ranging from zero to maximum competence (e.g. 0-100). The maximum competence corresponds to the weighted total score calculated for the organizational unit in step S12. For example, the overall competence level of the organizational unit "Management" is calculated by scaling the total score of 605 to a scale of competence from 0 to 100, whereby the maximum competence corresponds to the weighted total of 1162, so that the overall competence level of the organizational unit. "Management" amounts to (100/1162)*605=52 (see Table 3). Preferably, in step S13, the competence level of the organizational unit is calculated individually for the various organizational aspects. For example, for the organizational unit "Management", a competence level is calculated specifically for the organizational aspect related to organizational information (100/410*147=36).

In step S14, it is determined whether further organizational units are to be included in the assessment of organizational competence or whether processing of the collected data should continue in step S15. In user interface 6, this decision can be controlled by the user, for example the interviewer, by means of the command buttons 68, as was discussed in the context of step S10.

Figure 4:
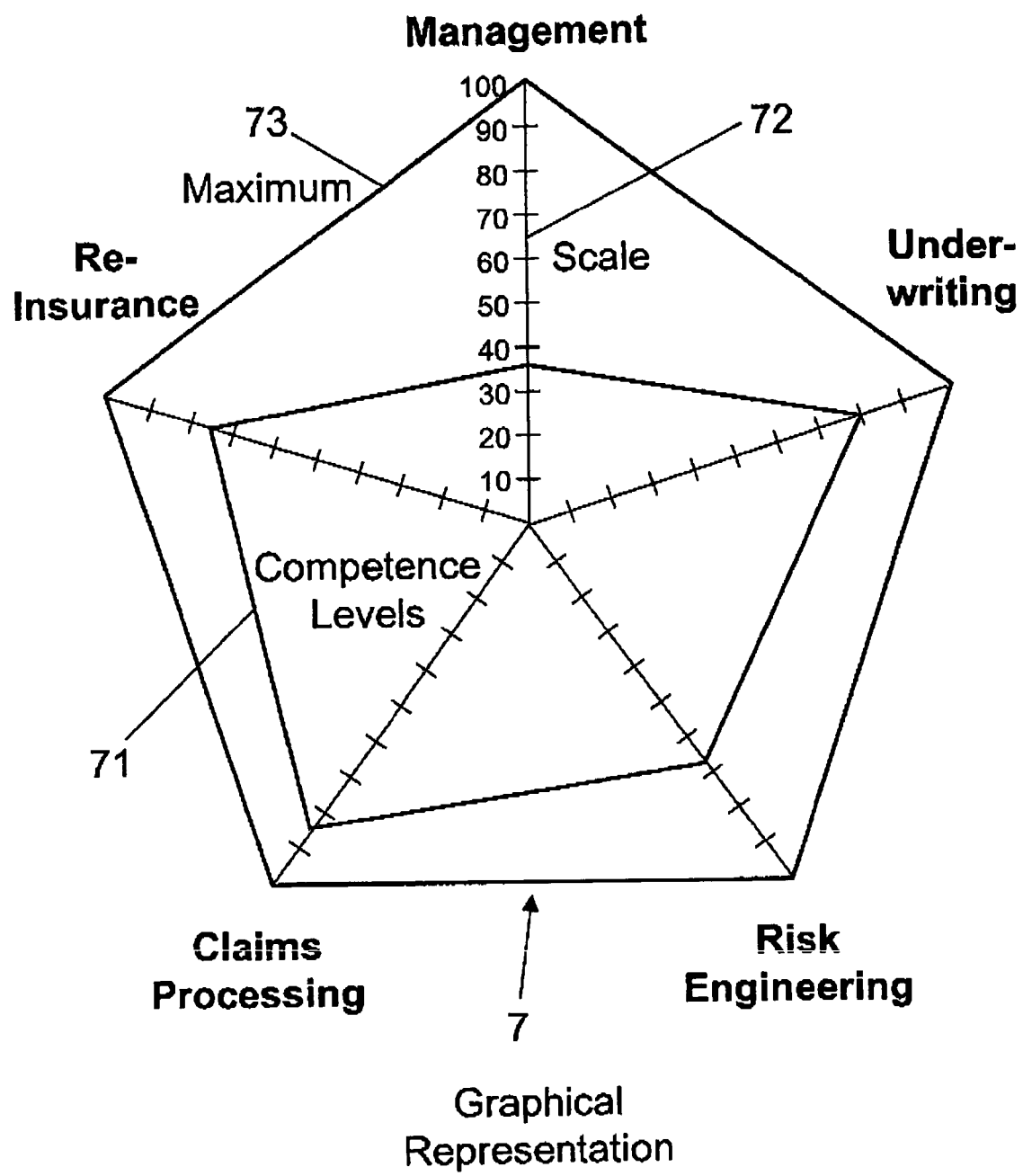
FIG. 4 shows an example of a graphical representation of the competence levels of an organization's organizational units generated according to the present invention.
Figure 5:
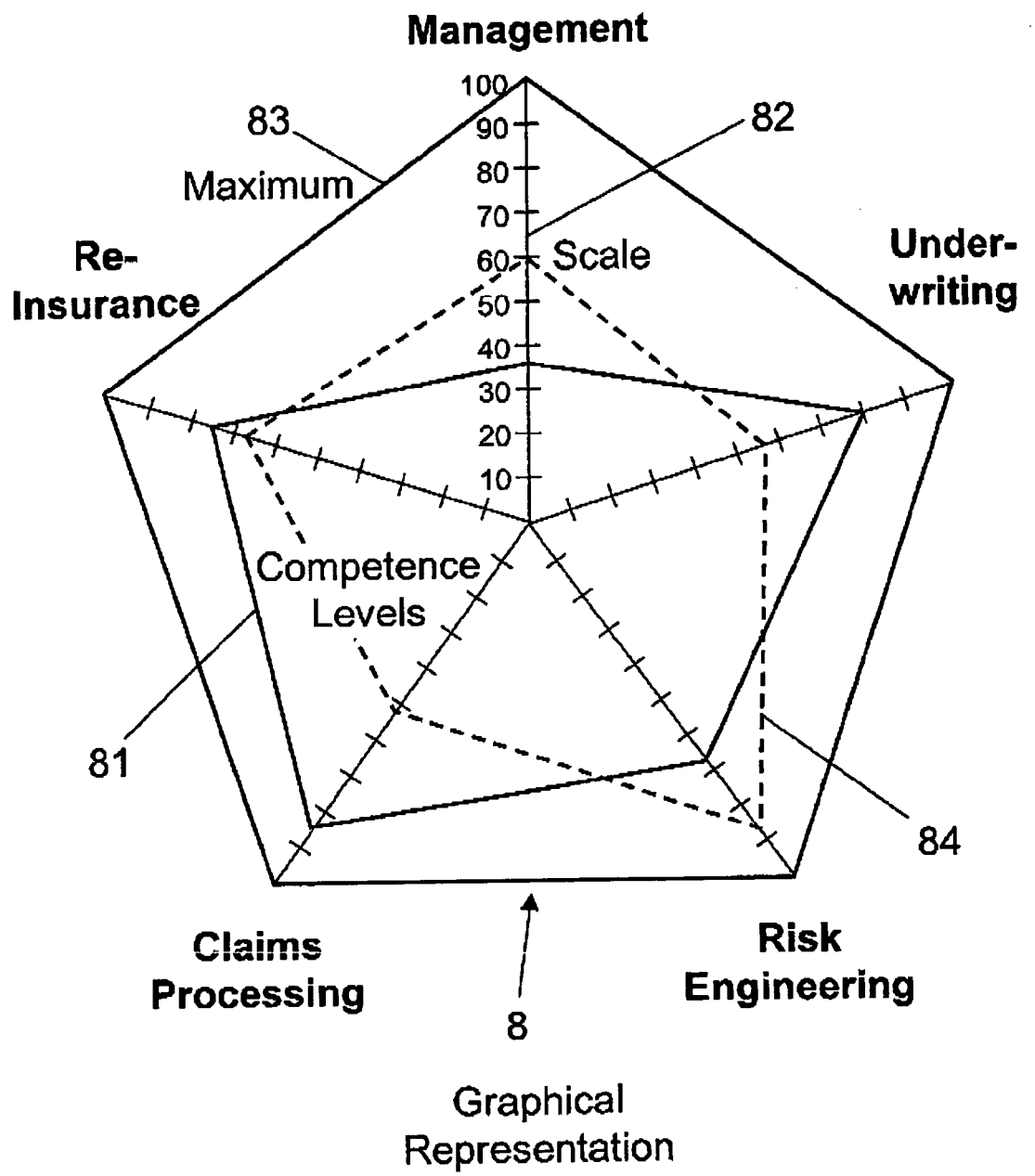
FIG. 5 shows an example of a graphical representation of the competence levels of organizational units of different organizations generated according to the present invention.

In step S15, computer 1 generates graphical representations 7, 8 of the competence levels calculated and stored in step S13. The graphics representations 7, 8 are displayed by computer 1 on display 3 or reproduced as a printed report 5 on printer 4. Preferably, the competence levels calculated for the different organizational units are displayed in one common graph so that deficiencies of the competence levels from the maximum competence are visualized and so that differences between the competence levels of the organizational units are visualized. As is illustrated in FIGS. 4 and 5, the graphical representation 7, 8 is preferably in the form of a so-called spider diagram. However, the graphical representation could also be in an alternative form, for example in the form of a bar chart.

Referring to the examples shown in FIGS. 4 and 5, the competence levels of the organizational units "Management", "Underwriting", "Risk Engineering", Claims Processing", and "Re-Insurance" are presented in a pentagon-shaped spider diagram, each of the vertices being assigned to one of the organizational units. Scales are drawn from the center point to the vertices, the numeric values of the scales being indicated in the vertical scale 72, 82. In FIGS. 4 and 5, the perimeter 73, 83 indicates the maximum competence level (100). In the example, line 71, 81 represents the competence levels of the organizational units of "Company A" with respect to the aspect of organizational information (see bold values in Table 3).

Referring to FIG. 5, the graphical representation 8 includes the competence levels of the organizational units of two organizations. Specifically, outlined by line 81, the graphical representation 8 shows the competence levels of the organizational units of "Company A" as shown in FIG. 4, and, outlined by line 84, the graphical representation 8 shows the competence levels for the corresponding organizational units of another organization.

If the competence level of an organizational unit is below a defined threshold, computer 1 indicates opportunities of improvement. For example, if the competence level of the organizational unit "Management" with respect to the aspect of organizational information is below 50, computer 1 indicates steps and areas of possible improvements. Computer 1 determines the steps and areas of possible improvements depending on the scores assigned to the questions related to the respective organizational aspect. Generally, questions with assigned low scores will determine the steps and areas of possible improvements. For example, computer 1 retrieves the steps and areas of possible improvements from a table stored in memory 12. Preferably, the steps and areas of possible improvements are determined by means of an expert system.

Figure 6:
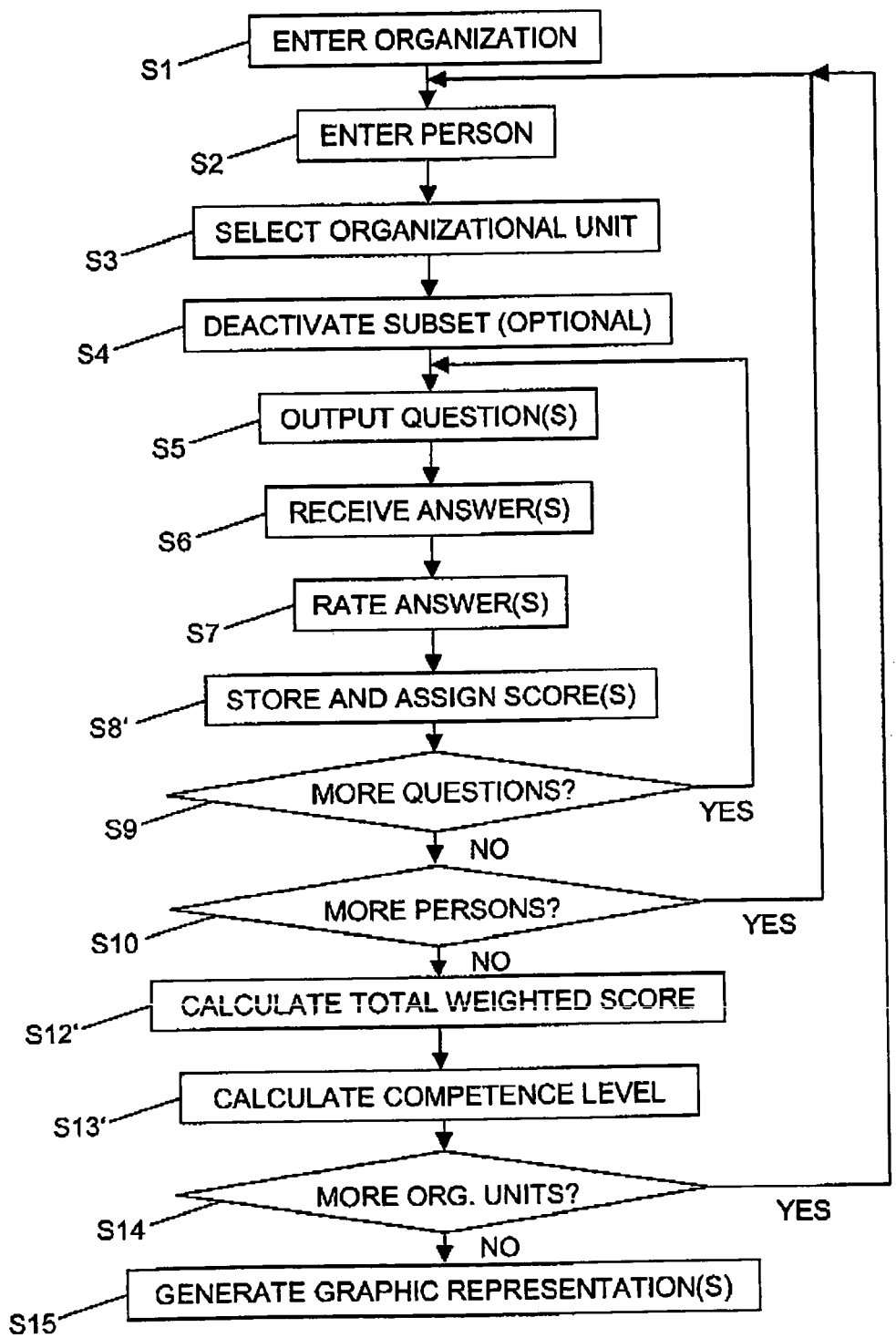
FIG. 6 shows a flow diagram illustrating an example of a sequence of steps executed according to an alternative embodiment of the present invention.

As is illustrated in FIG. 6, in an alternative embodiment, in step S8', the scores assigned to answers received for specific questions are weighted with weighting factors before being stored in memory 12. The weighting factors are determined by computer 1 based on the organizational unit and the defined question assigned to the respective score. For example, the weighting factors are determined from a table containing weighting factors assigned to organizational units and to questions $q_1, q_2, \ldots, q_n$. In the alternative embodiment, in step S12', the total weighted score of an organizational unit is calculated by adding up the weighted scores calculated in step S8'. In step S13', computer 1 calculates and stores the competence level of the organizational unit selected in step S3. In the alternative embodiment, in step S13', the competence level of the organizational unit is calculated by scaling the total weighted score of the organizational unit calculated in step S12' to a scale of competence ranging from zero to maximum competence. The maximum competence corresponds to the perfect total score achievable for the questions activated for the respective organizational unit.

What is claimed is:

1. A computer-based method for assessing competence of an organization comprising multiple organizational units, the method comprising:
    storing scores, in a memory device of a computer, corresponding to answers from each of the organizational units in response to a set of questions, the organizational units corresponding to different groups of individuals, and each of the different groups performing a different function within the organization;
    assigning, in the computer, each of said scores to the respective one of the organizational units;
    calculating, in the computer, total scores for the organizational units, each of the total scores being calculated by adding up the scores assigned to the respective organizational unit;
    calculating, in the computer, weighted total scores for the organizational units, each of the weighted total scores being calculated by adding up weighted maximum scores assigned to the questions for each organizational unit, the weighted maximum scores each depending on the respective organizational unit and the respective question; and
    calculating, in the computer, competence levels of the organizational units that are scaled to a scale of competence defined by a numerical range of zero to a maximum competence value by multiplying the maximum competence value by a ratio of the total score calculated for the respective organizational unit to the weighted total score calculated for the respective organizational unit.

2. The method of claim 1, wherein the questions relate to defined aspects of the organization, wherein the computer the total scores of the organizational units are calculated for a specific one of the defined aspects of the organization, each of the total scores being calculated by adding up the scores assigned to the respective organizational unit and to the specific one of the defined aspects of the organization, wherein in the computer the weighted total scores of the organizational units are calculated for a specific one of the defined aspects of the organization, each of the weighted total scores being calculated by adding up the weighted maximum scores assigned to the specific one of the defined aspects of the organization, and wherein in the computer the competence levels of the organizational units are calculated for the specific one of the defined aspects of the organization, each of the competence levels being calculated by scaling the total scores of the respective organizational unit to a scale of competence reaching from zero to a maximum competence, the maximum competence corresponding to the weighted total score calculated for the respective organizational unit and the specific one of the defined aspects of the organization.

3. The method according to claim 1, further comprising:
    generating a graphical representation in one common graph of the competence levels calculated for the organizational units, so that the competence levels are visualized, so that deficiencies of the competence levels from the maximum competence are visualized, and so that differences between the competence levels of the organizational units are visualized.

4. The method according to claim 3, wherein the calculating the competence levels includes calculating and storing competence levels for the organizational units of more than one organization, and the generating includes generating a graphical representation in one common graph of the competence levels of organizational units of more than one organization, so that differences between the competence levels of different organizations are visualized.

5. The method according to claim 1, further comprising:
    selecting one of the organizational units; and
    dividing the set of questions into different subsets, wherein the different subsets are activated or deactivated individually for the selected organizational unit, and wherein deactivated subsets are not included in calculating the competence levels of the organizational units.

6. The method according to claim 1, further comprising:
    storing data about answers from each of the organizational units; and
    determining with an expert system the score related to an answer by rating the data about the respective answer.

7. The method according to claim 1, wherein the questions relate to defined aspects of the organization and included in the defined aspects of the organization are an aspect of organizational resources relating to management of resources and know-how, an aspect of organizational information relating to management of documentation and information, and an aspect of organizational structure relating to processes, workflows, and organizational set-up.

8. The method according to claim 1, wherein an insurance company is used as the organization, and wherein included in the organizational units are a management unit, an underwriting unit, a risk management unit, a claims processing unit, and a re-insurance unit.

9. The method according to claim 1, further comprising deciding whether an additional individual from a particular organizational unit is provided with the set of questions.

10. A computer readable storage medium encoded with instructions, which when executed by a computer causes the computer to implement a method comprising:
    storing scores, in a memory device of the computer, corresponding to answers from each of multiple organizational units of an organization in response to a set of questions, the organizational units corresponding to different groups of individuals, and each of the different groups performing a different function within the organization;

assigning, in the computer, each of said scores to the respective one of the organizational units;

calculating, in the computer, total scores for the organizational units, each of the total scores being calculated by adding up the scores assigned to the respective organizational unit;

calculating, in the computer, weighted total scores for the organizational units, each of the weighted total scores being calculated by adding up weighted maximum scores assigned to the questions for each organizational unit, the weighted maximum scores each depending on the respective organizational unit and the respective question; and calculating, in the computer, competence levels of the organizational units, that are scaled to a scale of competence defined by a numerical range of zero to a maximum competence value by multiplying the maximum competence value by a ratio of the total score calculated for the respective organizational unit to the weighted total score calculated for the respective organizational unit.

11. The computer readable storage medium according to claim 10, wherein the calculating the total scores includes calculating the total scores of the organizational units for a specific one of a set of defined aspects of the organization, each of the total scores being calculated by adding up the scores assigned to the respective organizational unit and to the specific one of the defined aspects of the organization, that the computer calculates the weighted total scores of the organizational units for a specific one of the defined aspects of the organization, each of the weighted total scores being calculated by adding up the weighted maximum scores assigned to the specific one of the defined aspects of the organization, and that the computer calculates the competence levels of the organizational units for the specific one of the defined aspects of the organization, each of the competence levels being calculated by scaling the total scores of the respective organizational unit to a scale of competence reaching from zero to a maximum competence, the maximum competence corresponding to the weighted total score calculated for the respective organizational unit and the specific one of the defined aspects of the organization.

12. The computer readable storage medium according to claim 10, generating a graphical representation in one common graph of the competence levels calculated for the organizational units, so that the competence levels are visualized, so that deficiencies of the competence levels from the maximum competence are visualized, and so that differences between the competence levels of the organizational units are visualized.

13. The computer readable storage medium according to claim 12, wherein the calculating the competence levels includes calculating and storing competence levels for the organizational units of more than one organization, and the generating includes generating a graphical representation in one common graph of the competence levels calculated for the organizational units, so that differences between the competence levels of different organizations are visualized.

14. The computer readable storage medium according to claim 10, wherein the method further comprises:

selecting one of the organizational units; and dividing the set of questions into different subsets, wherein the different subsets are activated or deactivated individually for the selected organizational unit, and wherein deactivated subsets are not included in calculating the competence levels or the organizational units.

15. The computer readable storage medium according to claim 10, wherein the method further comprises:

storing data about answers from each of the organizational units; and determining with an expert system the score related to an answer by rating the data about the respective answer.

16. The computer readable storage medium according to claim 10, wherein the questions relate to defined aspects of the organization and the defined aspects of the organization to include an aspect of organizational resources relating to management of resources and know-how, an aspect of organizational information relating to management of documentation and information, and an aspect of organizational structure relating to processes, workflows, and organizational set-up.

17. The computer readable storage medium according to claim 10, wherein an insurance company is used as the organization, and the organizational units include a management unit, an underwriting unit, a risk management unit, a claims processing unit, and a re-insurance unit.

18. A computer-based method for assessing competence of an organization comprising multiple organizational units, the method comprising:

storing scores, in a memory device in a computer, corresponding to answers from each of the organizational units in response to a set of questions, the organizational units corresponding to different groups of individuals, and each of the different groups performing a different function within the organization;

assigning, in the computer, each of said scores to the respective one of the organizational units and to the respective one of the questions;

weighting, in the computer, said scores with weighting factors, the weighting factors being determined by the computer based on the organizational unit and the question assigned to the respective score;

calculating, in the computer, total scores for the organizational units, each of the total scores being calculated by adding up the weighted scores assigned to the respective organizational unit; and calculating, in the computer, competence levels of the organizational units, that are scaled to a scale of competence defined by a numerical range of zero to a maximum competence value by multiplying the maximum competence value by a ratio of the total score calculated for the respective organizational unit to the weighted scores calculated for the respective organizational unit.

19. The method of claim 18, wherein the questions relate to defined aspects of the organization, wherein in the computer the total scores of the organizational units are calculated for a specific one of the defined aspects of the organization, each of the total scores being calculated by adding up the weighted scores assigned to the respective organizational unit and to the specific one of the defined aspects of the organization, and wherein in the computer the competence levels of the organizational units are calculated for the specific one of the defined aspects of the organization, each of the competence levels being calculated by scaling the total scores of the respective organizational unit to a scale of competence reaching from zero to a maximum competence, the maximum competence corresponding to a perfect total score for the specific one of the defined aspects of the organization.

20. The method according to claim 18, further comprising:
generating a graphical representation in one common graph of the competence levels calculated for the organizational units, so that the competence levels are visualized, so that deficiencies of the competence levels from the maximum competence are visualized, and so that differences between the competence levels of the organizational units are visualized.

21. A computer readable storage medium encoded with instructions, which when executed by a computer causes the computer to implement a method comprising:
storing scores, in a memory device of the computer, corresponding to answers from each of multiple organizational units of an organization in response to a set of questions, the organizational units corresponding to different groups of individuals, and each of the different groups performing a different function within the organization;
assigning, in the computer, each of said scores to the respective one of the organizational units and to the respective one of the questions;
weighting, in the computer, said scores with weighting factors, the weighting factors being determined by the computer based on the organizational unit and the question assigned to the respective score;
calculating, in the computer, total scores for the organizational units, each of the total scores being calculated by adding up the weighted scores assigned to the respective organizational unit; and
calculating, in the computer, competence levels of the organizational units that are scaled to a scale of competence defined by a numerical range of zero to a maximum competence value by multiplying the maximum competence value by a ratio of the total score calculated for the respective organizational unit to the weighted scores calculated for the respective organizational unit.

22. The computer readable storage medium according to claim 21, wherein the calculating the total scores includes calculating the total scores of the organizational units for a specific one of a set of defined aspects of the organization, each of the total scores being calculated by adding up the weighted scores assigned to the respective organizational unit and to the specific one of the defined aspects of the organization, and that the computer calculates the competence levels of the organizational units for the specific one of the defined aspects of the organization, each of the competence levels being calculated by scaling the total scores of the respective organizational unit to a scale of competence reaching from zero to a maximum competence, the maximum competence corresponding to a perfect total score for the specific one of the defined aspects of the organization.

23. The computer readable storage medium according to claim 21, wherein the method further comprises:
generating a graphical representation in one common graph of the competence levels calculated for the organizational units, so that the competence levels are visualized so that deficiencies of the competence levels from the maximum competence are visualized, and so that differences between the competence levels of the organizational units are visualized.

* * * * *